(12) United States Patent
Agrawal et al.

(10) Patent No.: US 10,694,687 B2
(45) Date of Patent: Jun. 30, 2020

(54) ELECTRIC TREE FELLING HEAD AND ASSOCIATED CONTROL SYSTEM FOR A FORESTRY VEHICLE

(71) Applicant: Deere & Company, Moline, IL (US)

(72) Inventors: Bhupesh Agrawal, Maharashtra (IN); Sean Patrick West, Dubuque, IA (US)

(73) Assignee: DEERE & COMPANY, Moline, IL (US)

(*) Notice: Subject to any disclaimer, the term of this patent is extended or adjusted under 35 U.S.C. 154(b) by 305 days.

(21) Appl. No.: 15/674,991

(22) Filed: Aug. 11, 2017

(65) Prior Publication Data
US 2019/0045727 A1 Feb. 14, 2019

(51) Int. Cl.
| | |
|---|---|
| A01G 23/081 | (2006.01) |
| A01G 23/091 | (2006.01) |
| F04B 41/06 | (2006.01) |
| F04B 49/03 | (2006.01) |
| F04B 1/12 | (2020.01) |
| F16H 61/00 | (2006.01) |
| F04B 23/04 | (2006.01) |
| F04B 49/22 | (2006.01) |
| F03C 1/00 | (2006.01) |
| F04B 17/03 | (2006.01) |
| F04B 17/05 | (2006.01) |

(52) U.S. Cl.
CPC ........ *A01G 23/081* (2013.01); *A01G 23/091* (2013.01); *F03C 1/00* (2013.01); *F04B 1/12* (2013.01); *F04B 17/03* (2013.01); *F04B 17/05* (2013.01); *F04B 23/04* (2013.01); *F04B 41/06* (2013.01); *F04B 49/03* (2013.01); *F04B 49/22* (2013.01); *F16H 61/0003* (2013.01); *F04B 2203/0208* (2013.01)

(58) Field of Classification Search
CPC .... A01G 23/08; A01G 23/081; A01G 23/083; A01G 23/091
See application file for complete search history.

(56) References Cited

U.S. PATENT DOCUMENTS

| | | |
|---|---|---|
| 2008/0150460 A1 | 6/2008 | Rosskamp |
| 2016/0010664 A1 | 1/2016 | Gingras |
| 2019/0297793 A1* | 10/2019 | Eliasson ............... A01G 23/083 |

FOREIGN PATENT DOCUMENTS

WO 2008145817 12/2008

* cited by examiner

*Primary Examiner* — Matthew Katcoff
(74) *Attorney, Agent, or Firm* — Michael Best & Friedrich LLP (57) ABSTRACT

A tree feller-buncher includes a felling head having a saw blade, an engine carried by an undercarriage, a hydraulic system operably connected to the engine, at least one transient operably connected to the hydraulic system, and an electric system operably connected to the engine, the electric system configured to operate the saw blade.

38 Claims, 6 Drawing Sheets

ELECTRIC TREE FELLING HEAD AND ASSOCIATED CONTROL SYSTEM FOR A FORESTRY VEHICLE

FIELD OF THE DISCLOSURE

The present disclosure relates to systems and methods for felling trees, in particular with a forestry vehicle. More specifically, the present disclosure relates to an electric tree felling head for use with a forestry vehicle and an associated control system for the electric tree felling head.

BACKGROUND

Tree felling is the process of downing one or more trees. Tree felling is generally one of several steps of the logging process. For example, the logging process can also include one or more additional steps of limb removal from a main tree stem (or delimbing), bucking (or cutting) the main stem into a plurality of logs (or bolts), forwarding or skidding the cut stems or logs, sorting the cut stems or logs (e.g., by size, weight, species, quality, etc.), loading the cut stems or logs onto a vehicle, and transporting the cut stems or logs by the vehicle to a user.

Tree felling can be performed by hand (i.e., using an axe, saw, chainsaw, or other handheld device) or with mechanical assistance (i.e., using one or more pieces of logging equipment). A tree feller-buncher is a motorized mechanical felling vehicle that carries an attachment that cuts and gathers one or more trees during the process of tree felling. The attachment is commonly referred to as a felling head.

SUMMARY

In one aspect, the disclosure provides a tree feller-buncher that includes a felling head having a saw blade, an engine carried by an undercarriage, a hydraulic system operably connected to the engine, at least one transient operably connected to the hydraulic system, and an electric system operably connected to the engine, the electric system configured to operate the saw blade.

In another aspect, the disclosure provides an electric system for operating a saw blade of a felling head that includes a saw motor assembly including an electric machine operably connected to the saw blade, a power inverter operably connected to the electric machine, and an energy storage device operably connected to the power inverter. In a first configuration the electric machine is configured to motor the saw blade, and in a second configuration the electric machine is configured to generate electricity in response to the rotating saw blade.

Other aspects of the disclosure will become apparent by consideration of the detailed description and accompanying drawings.

DETAILED DESCRIPTION

Before embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

Various embodiments of the systems and methods disclosed herein are referenced in association with a tree feller-buncher. As used herein, the terms "feller-buncher" and "tree feller-buncher" include tree fellers, feller-bunchers, tracked feller-bunches, wheeled feller-bunchers, harvesters, and/or any vehicle, machine, or device configured to cut trees, move cut trees, or otherwise transport cut trees. In addition, the figures illustrate a tree feller-buncher, and more specifically a wheeled tree-feller buncher. The wheeled tree-feller buncher is shown for purposes of illustration, as one or more embodiments of a felling head 34 and an associated control system 200 can be implemented in association with any suitable feller-buncher, as defined above.

Figure 1:
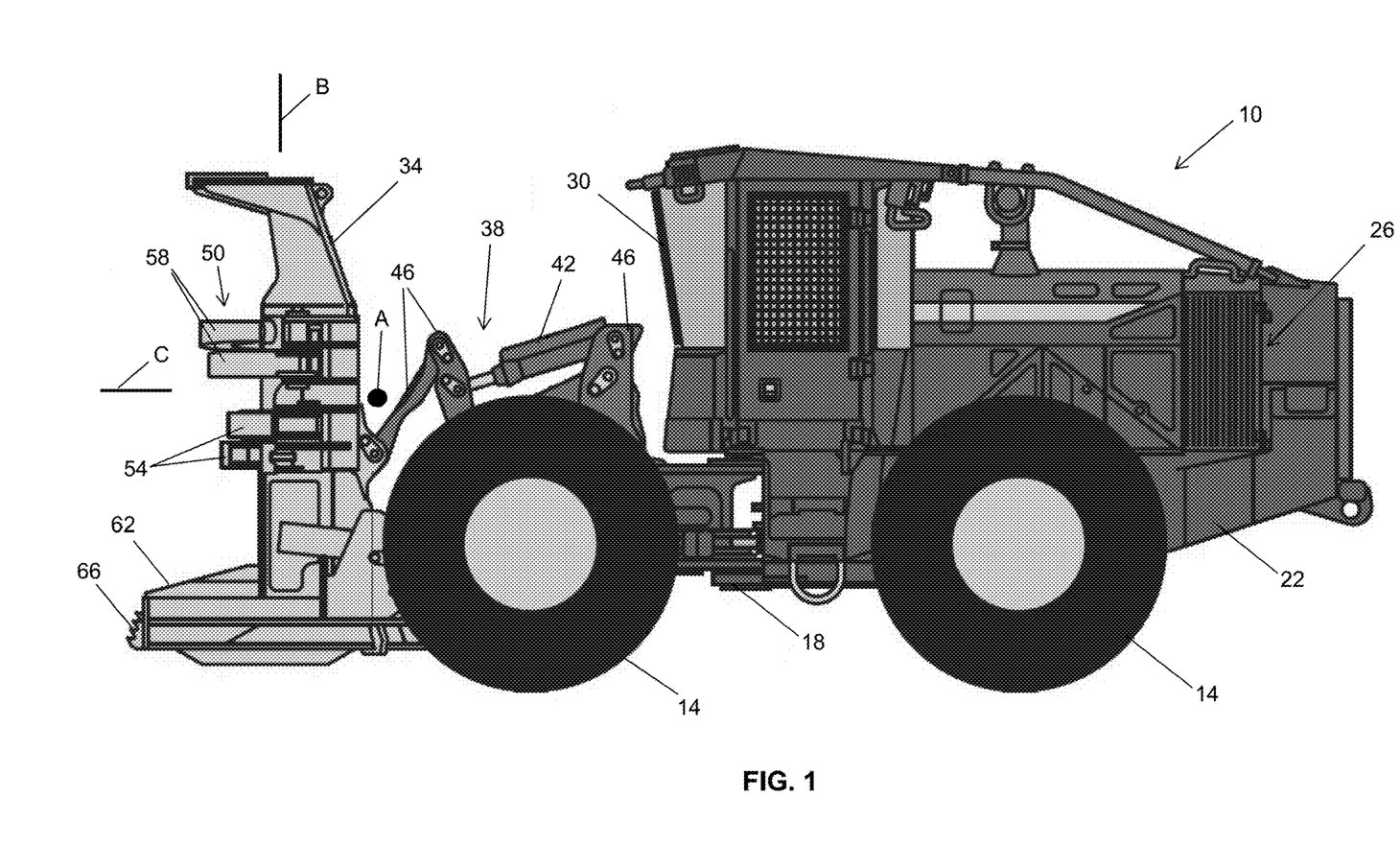
FIG. 1 is a side view of a tree feller-buncher.

Referring now to the figures, FIG. 1 illustrates an embodiment of a feller-buncher 10. The feller-buncher 10 includes a plurality of wheels 14 (or drive wheels 14) that are connected to an undercarriage or frame 18. The plurality of wheels 14 are divided into pairs, with each pair coupled to an axle (not shown) that is rotatably coupled to the undercarriage 18 to define a drivetrain. The illustrated feller-buncher 10 is an example of a wheeled feller-buncher. In other embodiments, the wheels 14 can be substituted for treads, tracks, or any other suitable motive assembly.

The undercarriage 18 carries a frame 22. The frame 22 houses an engine 26 and includes a cab 30. The engine 26 (or power source 26) is configured to provide power to the feller-buncher 10 and any associated implements (e.g., the wheels 14, a felling head 34, etc.). The cab 30 houses controls and at least one operator of the feller-buncher 10. The felling head 34 is coupled to the undercarriage 18 by an arm assembly 38. The arm assembly 38 is a hydraulic arm assembly 38 that includes at least one hydraulic cylinder 42 and a plurality of arms 46.

The hydraulic cylinder 42 is operable to move one or more of the arms 46 to facilitate movement of the felling head 34. The illustrated feller-buncher 10 is a "drive to tree" feller buncher, in that it does not include a boom to move the felling head 34 into engagement with one or more trees. Instead, the feller-buncher 10 is driven (e.g., an operator drives the entire vehicle) to engage the felling head 34 with one or more trees. It should be appreciated that the arm assembly 38 does provide for some movement of the felling head 34. For example, the arm assembly 38 can pivot the felling head 34 towards or away from the cab 30 (about axis A, which extends parallel to each wheel axle (not shown) of the feller-buncher 10). In addition, the arm assembly 38 can move the felling head 34 along axis B (i.e., up and/or down) or along axis C (i.e., forward and/or backwards). Axis B is arranged approximately perpendicular to axis A, while axis C is arranged approximately perpendicular to axis A and axis B, respectively. In other embodiments, the feller-buncher 10 can include a boom assembly (or boom) that can extend and/or retract relative to the undercarriage 18 and/or frame 22 to engage with one or more trees.

The felling head 34 includes a plurality of arms 50. The plurality of arms 50 can include a pair of gathering arms 54. In addition, the plurality of arms 50 can include a pair of accumulator arms 58. The felling head 34 also includes a saw 62 (or saw assembly 62). The saw 62 includes a saw blade 66. The gathering arms 54 (or harvesting arms 54) are configured to grasp at least one tree while it is cut with the saw blade 66. Once cut, the at least one tree is retained in the felling head 34 by the accumulator arms 58.

Figure 2:
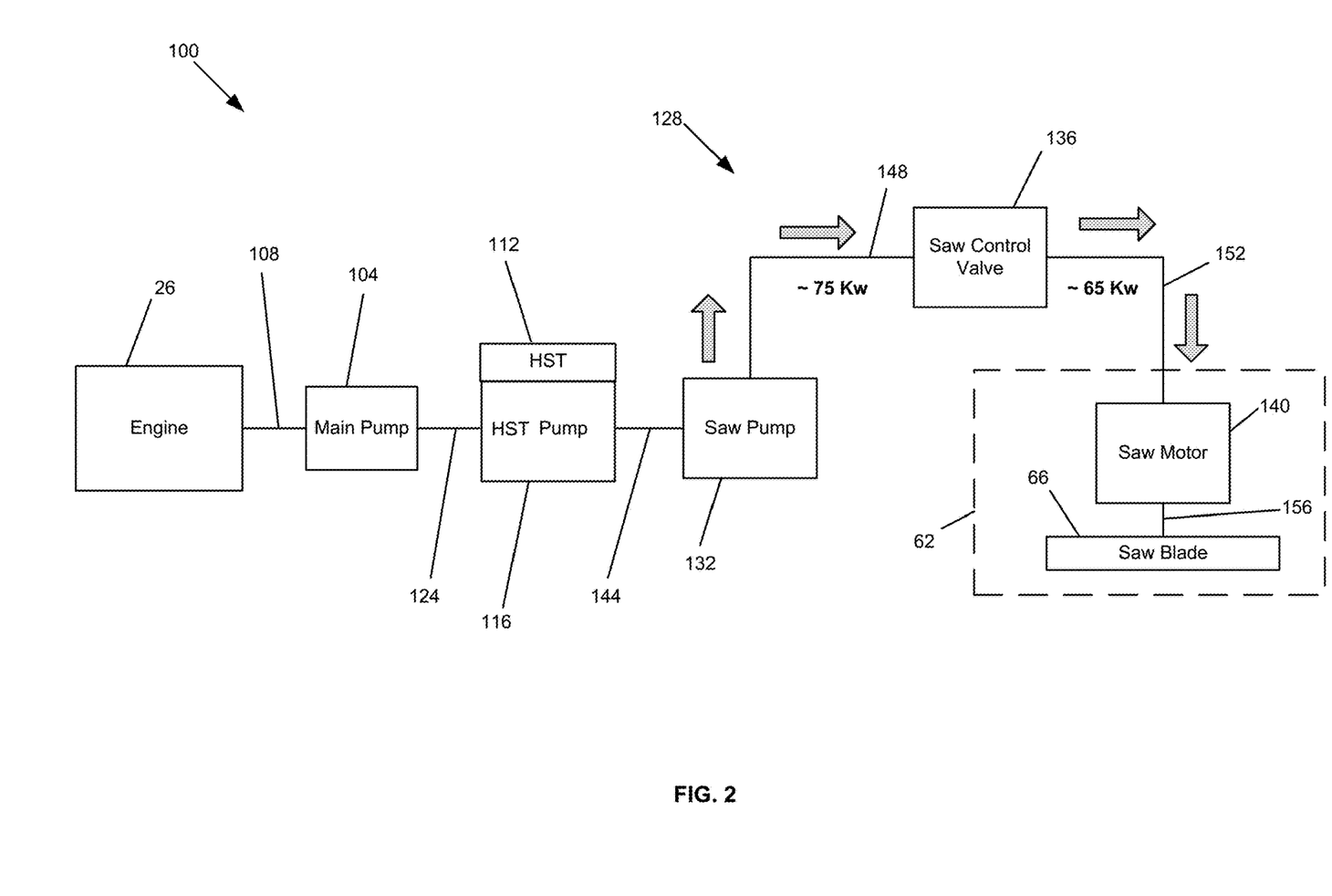
FIG. 2 is a schematic flow diagram of a hydraulic control system for a saw blade of a felling head during saw acceleration and/or during cutting of a tree, with a flow direction of hydraulic fluid shown with directional arrows.

FIG. 2 illustrates an embodiment of a hydraulic control system 100 for controlling the hydraulic saw assembly 62 of the felling head 34. The control system 100 includes a main hydraulic pump 104 (or a primary hydraulic pump 104, or a main pump 104, or a hydraulic pump 104) that is operably connected to the engine 26 of the feller-buncher 10. For example, the engine 26 can include a drive shaft 108 (or a driveline 108) that is coupled to the hydraulic pump 104 to transfer torque and/or rotation from the engine 26 to the hydraulic pump 104. The hydraulic pump 104 is operably connected to a hydrostatic transmission (or HST) 112. The HST 112 generally includes a pump 116 (or a HST pump 116). The HST pump 116 is coupled to the hydraulic pump 104 by a hydraulic line 124 to transfer hydraulic fluid from the hydraulic pump 104 to the HST pump 116.

The HST 112 is operably connected to a saw hydraulic system 128. The saw hydraulic system 128 includes a saw pump 132, a saw control valve 136, and a saw motor 140. The saw hydraulic system 128 hydraulically operates the saw assembly 62, and more specifically the saw blade 66 positioned on the felling head 34 (shown in FIG. 1). The HST pump 116 is operably coupled to the saw pump 128, for example by a connection 144. As such, the HST pump 116 and the saw pump 132 can be a tandem pump (or a tandem pump unit). The saw pump 132 is fluidly connected to the saw control valve 136 by a hydraulic fluid line 148 (or a first hydraulic fluid line 148). The saw motor 140 is also fluidly connected to the saw control valve 136 by a hydraulic fluid line 152 (or a second hydraulic fluid line 152).

The saw motor 140 is operably connected to a saw blade 66 on the felling head 34 (shown in FIG. 1), for example by a drive shaft 156. The saw pump 132 provides hydraulic fluid to the saw motor 140, with the saw control valve 136 controlling the flow of hydraulic fluid to the saw motor 140. When a sufficient (or desired) amount of hydraulic fluid is provided to the saw motor 140, the saw motor 140 hydraulically operates the saw blade 66, and more specifically rotates the saw blade 66.

With continued reference to FIG. 2, during acceleration of the saw blade 66 and/or during cutting of a tree, the saw pump 132 provides hydraulic fluid to the saw motor 140 through the saw control valve 136. The hydraulic fluid provided from the saw pump 132 to the saw control valve 136 has an equivalent of approximately 75 kilowatts (kW) of hydraulic power to the saw control valve 136. The hydraulic fluid flowing from the saw control valve 136 to the saw motor 140 has an equivalent of approximately 65 kilowatts (kW) of hydraulic power.

Figure 3:
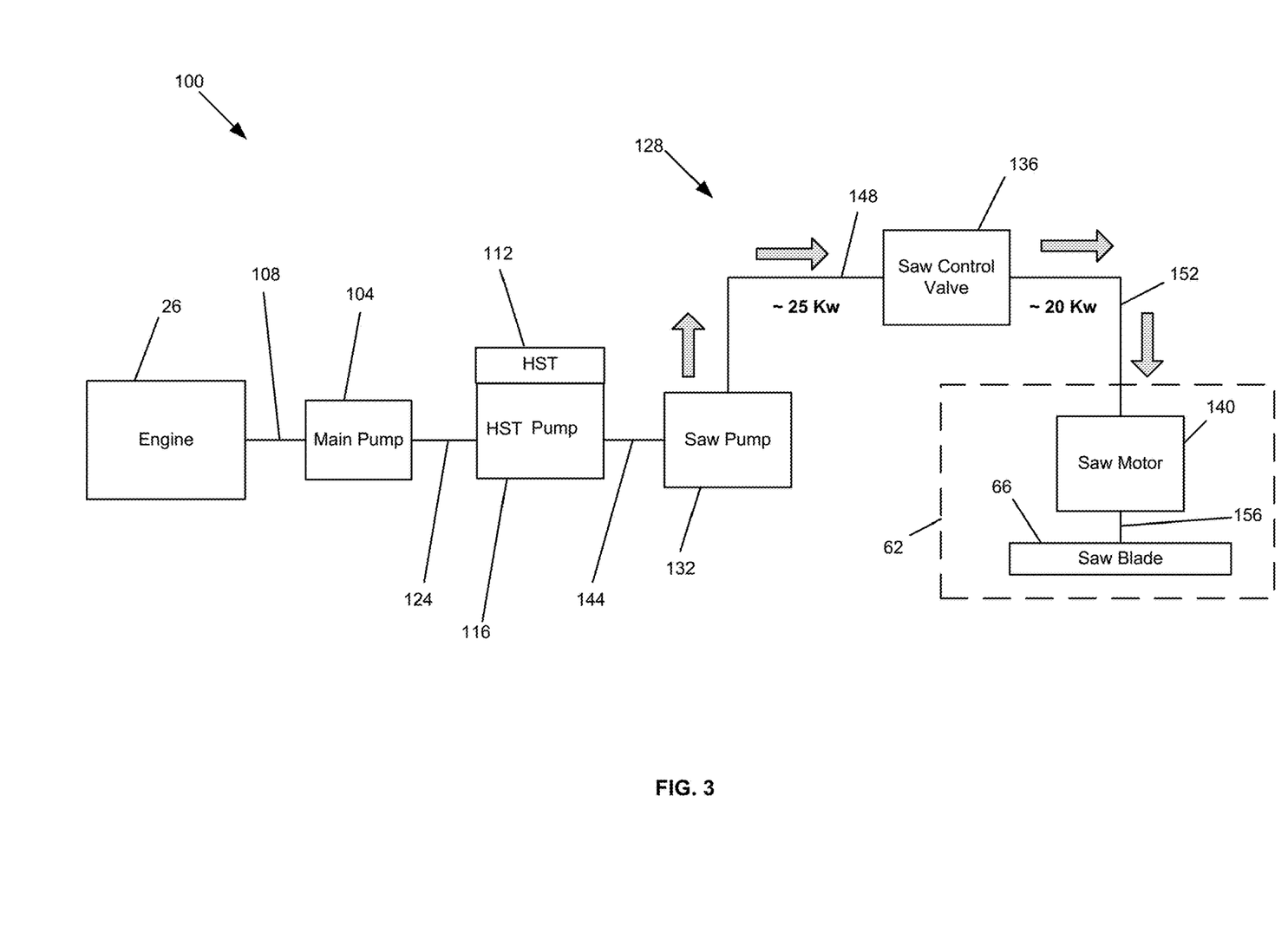
FIG. 3 is a schematic flow diagram of the hydraulic control system of FIG. 2 during idling of a saw blade while at full rotational speed, with a flow direction of hydraulic fluid shown with directional arrows.

FIG. 3 illustrates the hydraulic control system 100 at full saw speed (or rotational speed) and/or during saw idling. Once the saw blade 66 is at full rotational speed and/or is idling, the saw pump 132 provides hydraulic fluid to the saw control valve 136 that has an equivalent of approximately 25 kilowatts (kW) of hydraulic power. The hydraulic fluid flowing from the saw control valve 136 to the saw motor 140 has an equivalent of approximately 20 kilowatts (kW) of hydraulic power.

The hydraulic control system 100 for controlling the hydraulic saw assembly 62 of the felling head 34 has certain limitations. For example, there is no effective way to quickly slow or stop rotation of the saw blade 66. One option is to simply remove power to the saw blade 66, letting rotation of the saw blade 66 slow over time. However, this takes a long period of time for rotation of the saw blade 66 to slow and eventually stop. Another option is to "stump" the saw blade 66 by engaging the saw blade 66 with a tree, stump, or other wood while the power is removed from the saw blade 66. While this rapidly slows the saw blade 66 to a stop, it can cause damage to saw blade 66 or can result in the saw blade 66 becoming stuck, jammed, or otherwise embedded into the tree, stump, or other wood. In addition, the hydraulic control system 100 requires a substantial amount of energy to get the saw blade 66 to full rotational speed and maintain that rotational speed during saw idling and cutting.

Figure 4:
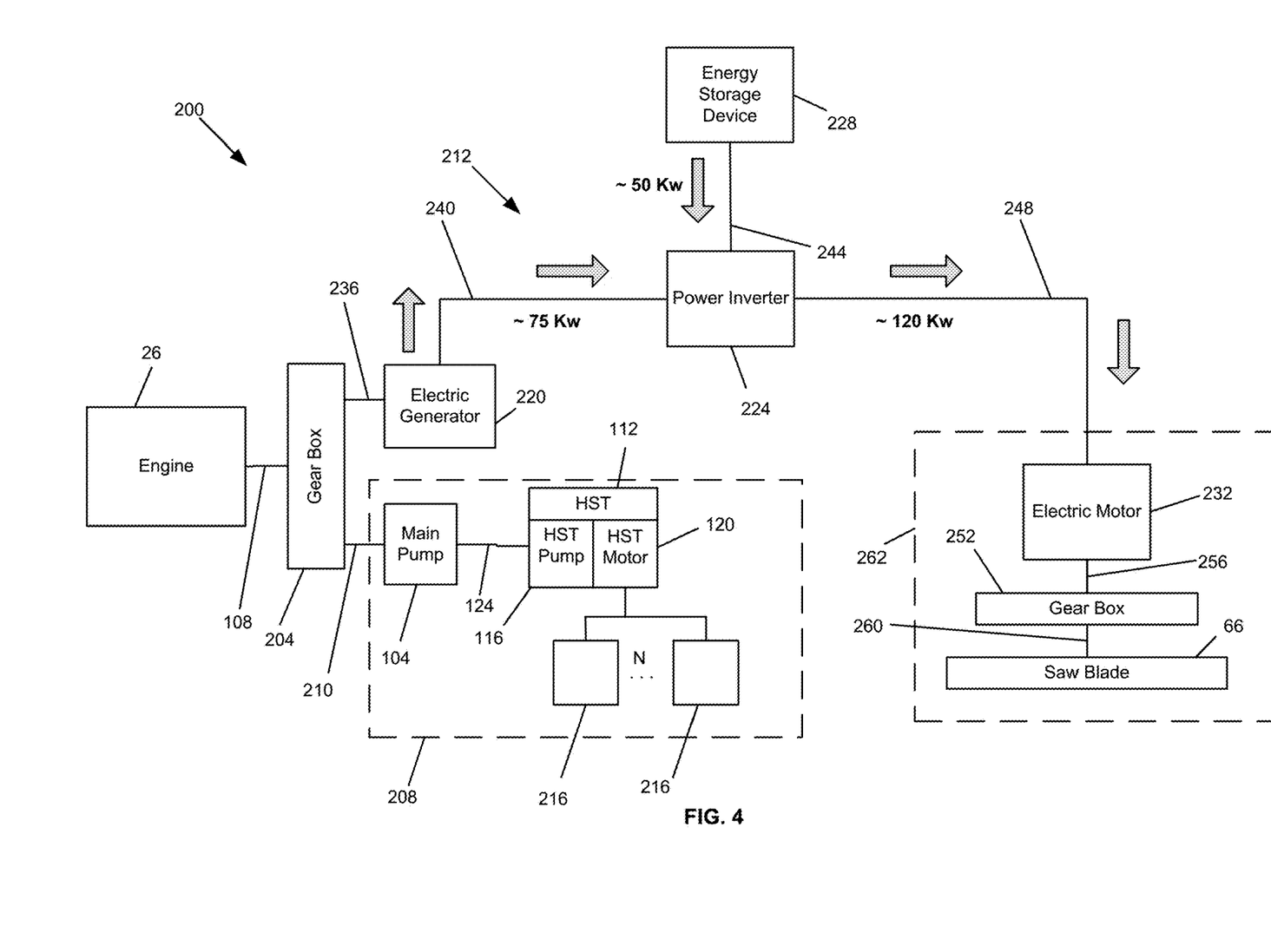
FIG. 4 is a schematic flow diagram of an electric control system for a felling head saw blade during a saw acceleration configuration or a saw blade speed increase configuration, with a flow direction of electrical power shown with directional arrows.
Figure 5:
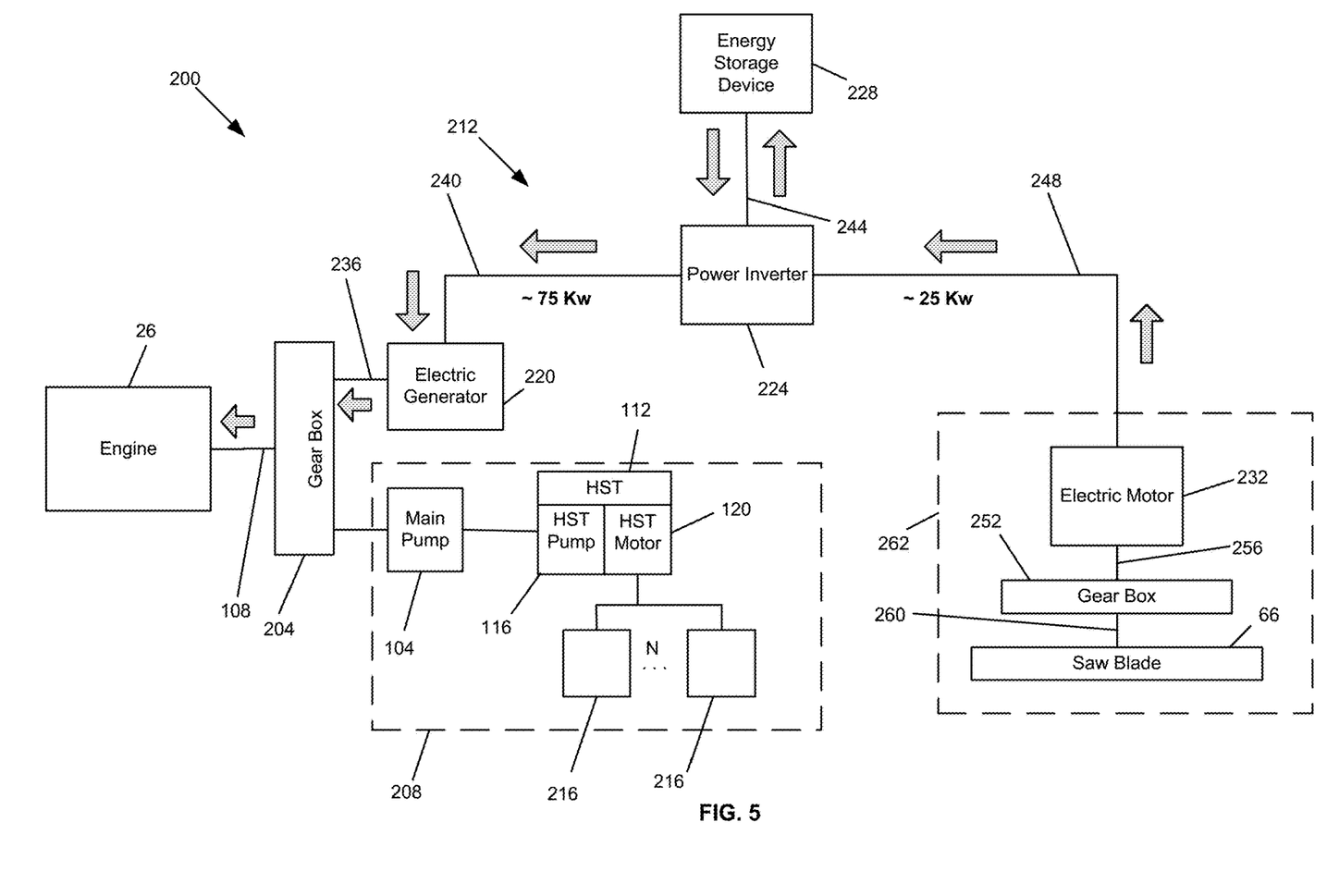
FIG. 5 is a schematic flow diagram of the electric control system for the felling head saw blade of FIG. 4 during a braking configuration and an engine idling configuration, with a flow direction of electrical power and operational inputs shown with directional arrows.
Figure 6:
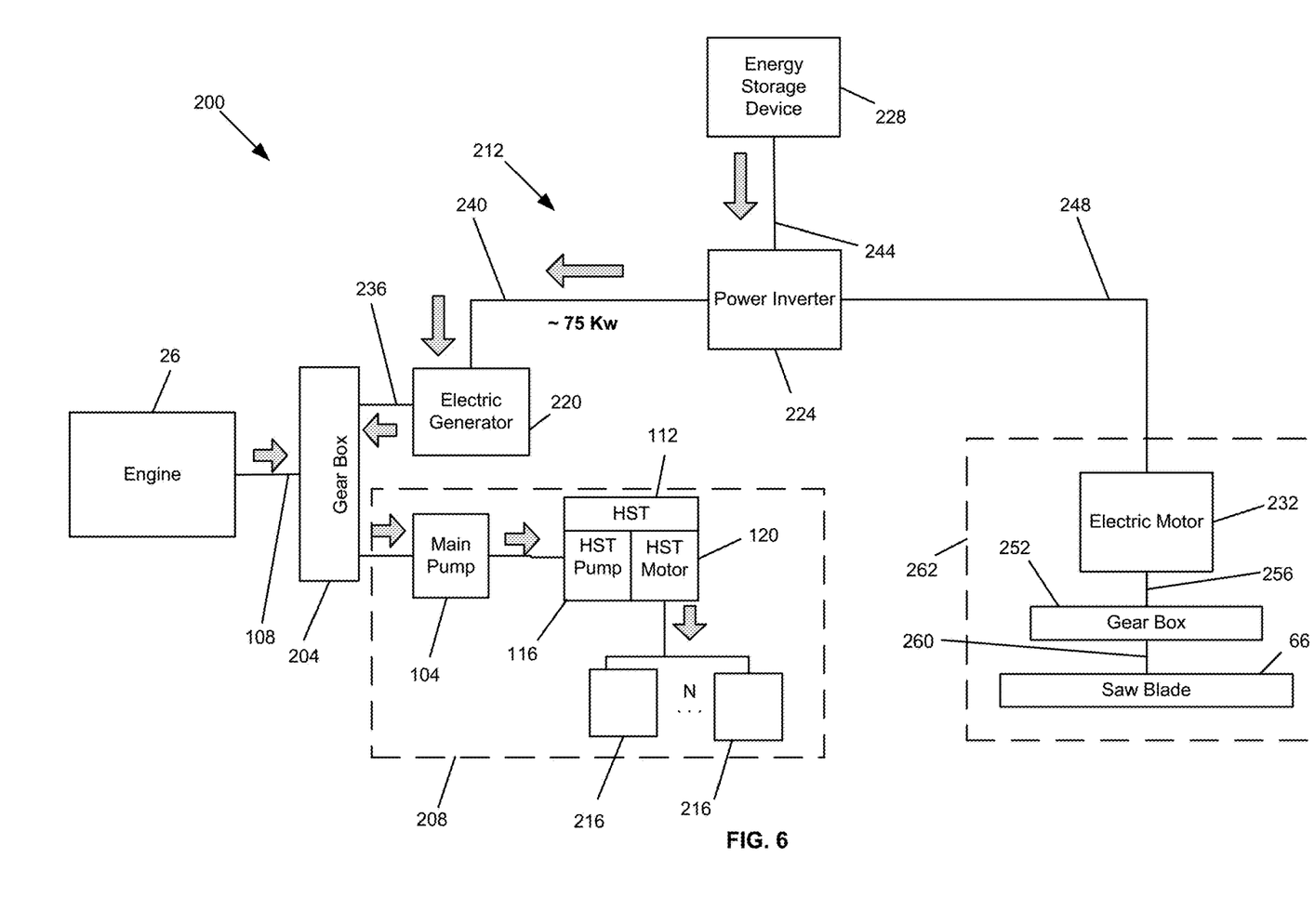
FIG. 6 is a schematic flow diagram of the electric control system for the felling head saw blade of FIG. 4 during drivetrain transient balancing, with a flow direction of electrical power and operational inputs shown with directional arrows.

FIGS. 4-6 illustrate an embodiment of an improved electric control system 200 configured to control a saw motor assembly 262 for the felling head 34 of the feller-buncher 10. The system 200 includes some similar components to the system 100, with like numbers identifying like components. With specific reference to FIG. 4, the system 200 includes a gear box 204 that is operably connected to the engine 26. The gear box 204 can be coupled to the engine 26 by the drive shaft 108 (or the driveline 108). The gear box 204 is in turn operably connected to a hydraulic system 208 and an electric system 212.

The hydraulic system 208 includes the main hydraulic pump 104 (or main pump 104) that is operably connected to the hydrostatic transmission (or HST) 112. The hydraulic pump 104 is coupled to the gear box 204, for example by a drive shaft 210. The HST pump 116 is mechanically coupled to the hydraulic pump 104 by a connection 124. As such, the hydraulic pump 104 and the HST pump 116 can be a tandem pump (or a tandem pump unit). An HST motor 120 is driven by the HST pump 116. At least one transient 216 (or a plurality of transients 216) can be operably connected to the HST motor 120 to operate in response to the HST 112. The at least one transient 216 can include any component of the feller-buncher 10 that is hydraulically operated (e.g., additional torque to operate wheels 14, additional power to lift or otherwise move the felling head 34, etc.) or is electrically operated (e.g., the saw blade 66, etc.), and that at one or more moments in time requires a duration of additional power (e.g., electric, hydraulic, etc.) to operate. Generally, the duration of additional power is short term in that the term of additional power is less than the power needed during steady state operation (or "typical" operation). In this way, the additional power requirement by the at least one transient 216 is a transient load. It should be appreciated that a single transient 216, a plurality of transients 216, or any suitable number N of transients can be operably connected to the HST 112.

The electric system 212 includes an electric generator 220 (or an electric machine 220 or a first electric machine 220), a power inverter 224, an energy storage device 228, and an electric motor 232 (or an electric machine 232 or a second electric machine 232). The electric generator 220 is operably connected (or otherwise connected) to the gear box 204, for example by a drive shaft 236. The electric generator 220 is also operably connected (or electrically connected) to the power inverter 224 by any suitable electrical connection 240 (e.g., wiring, etc.). The power inverter 224 can be a PD400 Dual Inverter for motor control supplied by JOHN DEERE ELECTRONIC SOLUTIONS located in Fargo, N. Dak., USA. In other embodiments, the power inverter 224 can be any inverter that receives and transfers electricity suitable for operation of the electric system 212 as described herein. The power inverter 224 is operably connected to the energy storage device 228 by a suitable electrical connection 244 (e.g., wiring, etc.). The energy storage device 228 can be a battery, a battery pack having a plurality of battery cells, a capacitor, a combination of at least one battery cell and at least one capacitor, or any other suitable device for receiving electricity, storing electricity, and subsequently distributing (or otherwise sending) the stored electricity. The power inverter 224 is also operably connected to the electric motor 232 by a suitable electrical connection 248 (e.g., wiring, etc.).

The electric motor 232 (or an electric machine 232 or a second electric machine 232) is configured to operate the saw blade 66 of the felling head 34 in a first configuration (or motoring configuration). In addition, the electric motor 232 (or electric machine 232) is configured to generate electricity based on inertia of the saw blade 66 of the felling head 34 in a second configuration (or generating configuration). As such, the electric motor 232 will be referred to hereon as the electric machine 232 (or saw electric machine 232). The electric machine 232 is operably connected to a gear box 252, for example by a drive shaft 256. The gear box 252 is in turn operably connected to the saw blade 66, for example by a drive shaft 260. It should be appreciated that the electric machine 232, the gear box 252, and the saw blade 66 together define the electric saw motor assembly 262. The saw motor assembly 262 is substantially similar to the saw motor assembly 62, except that the saw motor assembly 262 is electrically powered while the saw motor assembly 62 is hydraulically powered. Accordingly, each saw motor assembly 62, 262 includes respective components to operate as either by hydraulic power or electric power, respectively.

FIG. 4 also illustrates operation of the electric control system 200 during acceleration of the saw blade 66 (a saw acceleration configuration). During acceleration of the saw blade 66, the electric generator 220 can provide electrical power to the power inverter 224. In addition, the energy storage unit 228 can also provide electrical power to the power inverter 224. The power inverter 224 can then transfer the combined electrical power to the electric machine 232 to energize operation of the saw blade 66. In the illustrated embodiment, the electric generator 220 provides approximately 75 kilowatts (kW) of electrical power to the power inverter 224, while the energy storage device 228 provides approximately 50 kilowatts (kW) of electrical power to the power inverter 224. The power inverter 224 transfers the combined electrical power as approximately 120 kilowatts (kW) of electrical power to the electric machine 232. In other embodiments, the combined electrical power can be approximately 100 kilowatts (kW) to approximately 140 kilowatts (kW), and further in yet other embodiments the combined electrical power can be any suitable or desired amount of electrical power. The increased electrical power to the electric machine 232 results in an increased acceleration of the saw blade 66 over the hydraulic only system 100 illustrated in FIGS. 2-3. This is because the electric control system 200 provides more power (e.g., approximately 120 kilowatts (kW)) to the electric saw motor assembly 262 than the equivalent hydraulic power provided to the hydraulic saw motor assembly 62 (e.g., approximately 65 kilowatts (kW)). As an example, the added power of the electric control system 200 can enable the system 200 to achieve approximately a 50% faster acceleration of the saw blade 66 than the hydraulic only system 100, and more generally approximately a 10% faster acceleration to approximately a 50% faster acceleration than the hydraulic only system 100, and more generally at least a 10% faster acceleration than the hydraulic only system 100. It should also be appreciated once the saw is at full speed, the electrical demand of the electric saw motor assembly 262 goes down (i.e., the electric saw motor assembly 262 does not require up to approximately 120 kilowatts (kW) of electric power to maintain rotational speed of the saw blade 66 when not under load (or idling)). Accordingly, the electric control system 200 can also provide additional electrical power to the electric saw motor assembly 262 (and the saw blade 66) as needed (or on-demand). For example, the electric system has sufficient power that the saw blade 66 can operate at different rotational speeds. The electric control system 200 can provide additional power to increase the RPM of the saw blade 66 in an on-demand situation (e.g., cutting a large diameter tree where cutting can slow rotation of the saw blade 66), or to provide an optimized saw blade 66 rotational speed based on tree stem material (e.g., tree species, wood moisture, etc.) in order to optimize tree removal performance (e.g., reduce waste, reduce dulling of the saw blade 66, etc.). The additional electrical power to increase the saw blade 66 rotation speed (or to operate in a saw blade speed increase configuration) can be from the electric generator 220, the energy storage device 228, or a combination of both the electric generator 220 and the energy storage device 228.

In addition to faster acceleration of the saw blade 66 and adjustment of saw blade 66 rotational speed, the system 200 can more quickly stop the saw blade 66 than the hydraulic only system 100. More specifically, the system 200 can act as a brake on the saw blade 66 while also generating electricity through the braking process. Referring now to FIG. 5, the system 200 is illustrated in a braking configuration (or braking mode, or power generation configuration, or power generation mode). In this braking configuration, the saw blade 66 is not only slowed, but the braking results in generation of electricity. To enter the braking configuration, the torque is reversed on the electric machine 232 (or the electric machine 232 is operating with a negative torque). The torque can be reversed by operator intervention (e.g., the operator can actuate a button or take some other affirmative step to slow the saw blade 66, etc.). With the electric machine 232 torque reversed, rotation of the saw blade 66 drives the electric motor 232 (via the gear box 252). Stated another way, electrical power is being generated by the electric machine 232 in response to inertia of the saw blade 66, instead of the electric machine 232 consuming electrical power to rotate the saw blade 66. This facilitates the electric machine 232 to generate electricity, which is transmitted (or otherwise provided) by the electrical connection 248 to the power inverter 224. In the illustrated embodiment, in the braking configuration the electric machine 232 generates approximately 25 kilowatts (kW) of electrical power. Since the saw blade 66 is driving the electric machine 232 through rotational inertia, the saw blade 66 slows during electricity generation. Accordingly, the described generation of electricity acts as a brake on the saw blade 66.

The power inverter 224 can direct the electricity generated during braking of the saw blade 66 to the energy storage device 228, where the electricity can be stored for later use. In addition, or alternatively, the power inverter 224 can direct the electricity generated during braking of the saw blade 66 to the electric generator 220.

With continued reference to FIG. 5, electricity generated by and/or stored in the electric system 212 can be used to idle the engine 26, reducing fuel consumption by the engine 26. In this engine idling configuration (or engine idling mode), the power inverter 224 transmits electrical power (or electricity) to the electric generator 220. The electrical power (or electricity) can be generated by the electric machine 232 during braking (or slowing) of the saw blade 66, can be stored by the energy storage device 228, or can be a combination of both. Independent of the source of electrical power (or electricity), the power inverter 224 can transmit sufficient electricity (or electrical power) to operate the electric generator 220 such that the electric generator 220 provides a positive torque on the drive shaft 108 relative to the engine 26. In this configuration, the electric generator 220 is also an electric machine 220. More specifically, the electric machine 220 generates electricity in the configuration illustrated in FIG. 4. In the configuration illustrated in FIG. 5, the electric machine 220 acts as a motor (or is motoring) by assisting to drive (or driving) the drive shaft 108. In the illustrated embodiment, the power inverter 224 can transmit approximately 75 kilowatts (kW) of electrical power to the electric machine 220. In this "motoring mode," the electric machine 220 drives the gear box 204 (through the drive shaft 236). The engine 26 can then be defueled (or have no fuel supplied), such that the engine 26 is a consumer of torque instead of a producer of torque. Thus, the gear box 204 delivers torque from the electric system 212 to keep the engine 26 idling (or moving) without the engine 26 having to consume fuel. The engine 26 effectively acts as an air pump. It should be appreciated that the engine idling configuration can occur in conjunction with or independent from the braking configuration.

With reference now to FIG. 6, the system 200 is illustrated in a drivetrain transient balancing configuration (or drivetrain balancing mode, or drivetrain balancing configuration, or balancing configuration). In this balancing configuration, electrical power from the electric system 212 is transferred to the hydraulic system 208 in order to level out peak loads on the engine 26. Stated another way, in certain events the power draw on the engine 26 can be so great it can come close to "cornering" or maxing out the power supplied by the engine 26. In order to reduce the power draw on the engine 26 in these circumstances, electrical power is drawn from the energy storage device 228 to the power inverter 224, where it is transmitted to the electric machine 220. The electric machine 220 can then transmit the electrical power to the gear box 204, where it can supplement power provided from the engine 26 to support the high power draw by the hydraulic system 208. Examples of situations that can lead to a high power draw event can be one or more of additional torque required to rotate the wheels 14 (see FIG. 1) (e.g., the feller-buncher 10 is traversing through a wet or swamp like area, an area with high snow fall, a sloped area, etc.), the felling head 34 is lifting or otherwise moving while carrying one or more trees (or stems), the feller-buncher 10 is traversing an area while carrying a load in the felling head 34 (e.g., one or more trees or stems, etc.), or the feller-buncher 10 is transitioned from moving forward to moving in reverse, etc. The balancing configuration allows the feller-buncher 10 to respond to certain high power draw events with more power, while advantageously leveling out peak loads on the engine 26.

Various features and advantages of the disclosure are set forth in the following claims.

What is claimed is:

1. A tree feller-buncher comprising:
   a felling head having a saw blade;
   an engine carried by an undercarriage;
   a hydraulic system operably connected to the engine;
   at least one transient operably connected to the hydraulic system; and
   an electric system operably connected to the engine, the electric system including:
      a first electric machine configured to generate electricity in a first configuration;
      a power inverter operably connected to the first electric machine;
      an energy storage device operably connected to the power inverter; and
      a second electric machine operably connected to the power inverter,
      wherein in the first configuration, the second electric machine is configured to power rotation of the saw blade in a first direction to cut at least one tree, and
      wherein in a second configuration, the second electric machine is configured to generate electricity from rotation of the saw blade.

2. The tree feller-buncher of claim 1, wherein a torque on the second electric machine is reversed from the first configuration to the second configuration.

3. The tree feller-buncher of claim 1, wherein the energy storage device is a battery.

4. The tree feller-buncher of claim 1, wherein the energy storage device includes at least one battery cell.

5. The tree feller-buncher of claim 1, wherein the energy storage device includes at least one capacitor.

6. The tree feller-buncher of claim 1, wherein the first electric machine is configured to receive electrical power from the energy storage device and the second electric machine.

7. The tree feller-buncher of claim 6, wherein the engine is operably connected to a gear box, the gear box being operably connected to the hydraulic system and to the electric system.

8. The tree feller-buncher of claim 7, wherein
   in the first configuration, the gear box is configured to drive the hydraulic system and the first electric machine, and
   in the second configuration, the first electric machine is configured to receive electrical power from one of the energy storage device or the second electric machine and drive the gear box.

9. The tree feller-buncher of claim 7, wherein the gear box is configured to drive the engine in response to the engine being defueled.

10. The tree feller-buncher of claim 7, wherein the first electric machine and the engine are both configured to drive the gear box in response to a high power draw by the hydraulic system.

11. The tree feller-buncher of claim 10, wherein the first electric machine is configured to supplement power transmitted by the engine to the gear box.

12. The tree feller-buncher of claim 6, wherein the first electric machine and the engine are both configured to drive the hydraulic system in response to a high power draw by the hydraulic system.

13. The tree feller-buncher of claim 1, wherein the power inverter is configured to receive electrical power from the first electric machine and the energy storage device, and further configured to transfer the electrical power to the second electric machine.

14. The tree feller-buncher of claim 1, wherein the second configuration is a braking configuration that brakes the saw blade.

15. A tree feller-buncher comprising:
a felling head having a saw blade;
an engine carried by an undercarriage;
a hydraulic system operably connected to the engine;
at least one transient operably connected to the hydraulic system; and
an electric system operably connected to the engine, the electric system including:
an electric generator configured to generate electricity in a first configuration;
a power inverter operably connected to the electric generator;
an energy storage device operably connected to the power inverter; and
an electric motor operably connected to the power inverter, the electric motor configured to operate the saw blade in the first configuration;
wherein the electric generator is configured to receive electrical power from the energy storage device and the electric motor, and
wherein the engine is operably connected to a gear box, the gear box being operably connected to the hydraulic system and to the electric system.

16. The tree feller-buncher of claim 15,
wherein in the first configuration, the electric motor is configured to power rotation of the saw blade in a first direction to cut at least one tree, and
wherein in a second configuration, the electric motor is configured to generate electricity from rotation of the saw blade.

17. The tree feller-buncher of claim 16, wherein a torque on the electric motor is reversed from the first configuration to the second configuration.

18. The tree feller-buncher of claim 15, wherein the power inverter is configured to receive electrical power from the electric generator and the energy storage device, and further configured to transfer the electrical power to the electric motor.

19. The tree feller-buncher of claim 16, wherein the second configuration is a braking configuration that brakes the saw blade.

20. The tree feller-buncher of claim 15, wherein the energy storage device is a battery.

21. The tree feller-buncher of claim 15, wherein
in the first configuration, the gear box is configured to drive the hydraulic system and the electric generator, and
in a second configuration, the electric generator is configured to receive electrical power from one of the energy storage device or the electric motor and drive the gear box.

22. The tree feller-buncher of claim 15, wherein the gear box is configured to drive the engine in response to the engine being defueled.

23. The tree feller-buncher of claim 15, wherein the electric generator and the engine are both configured to drive the gear box in response to a high power draw by the hydraulic system.

24. The tree feller-buncher of claim 23, wherein the electric generator is configured to supplement power transmitted by the engine to the gear box.

25. The tree feller-buncher of claim 15, wherein the electric generator and the engine are both configured to drive the hydraulic system in response to a high power draw by the hydraulic system.

26. A tree feller-buncher comprising:
a felling head having a saw blade;
an engine carried by an undercarriage;
a hydraulic system operably connected to the engine;
at least one transient operably connected to the hydraulic system; and
an electric system operably connected to the engine, the electric system including an electric motor operably connected to the saw blade, the electric motor configured to operate in a first configuration or a second configuration,
wherein in the first configuration, the electric motor is configured to power rotation of the saw blade in a first direction to cut at least one tree, and
wherein in the second configuration, the electric motor is configured to generate electricity from rotation of the saw blade.

27. The tree feller-buncher of claim 26, the electric system further comprising:
an electric generator configured to generate electricity in the first configuration;
a power inverter operably connected to the electric generator;
an energy storage device operably connected to the power inverter; and
the electric motor operably connected to the power inverter.

28. The tree feller-buncher of claim 26, wherein a torque on the electric motor is reversed from the first configuration to the second configuration.

29. The tree feller-buncher of claim 26, wherein the energy storage device is a battery.

30. The tree feller-buncher of claim 27, wherein electric generator is configured to receive electrical power from the energy storage device and the electric motor.

31. The tree feller-buncher of claim 27, wherein the engine is operably connected to a gear box, the gear box being operably connected to the hydraulic system and to the electric system.

32. The tree feller-buncher of claim 31, wherein
in the first configuration, the gear box is configured to drive the hydraulic system and the electric generator, and
in the second configuration, the electric generator is configured to receive electrical power from one of the energy storage device or the electric motor and drive the gear box.

33. The tree feller-buncher of claim 31, wherein the gear box is configured to drive the engine in response to the engine being defueled.

34. The tree feller-buncher of claim 31, wherein the electric generator and the engine are both configured to drive the gear box in response to a high power draw by the hydraulic system.

35. The tree feller-buncher of claim 31, wherein the electric generator is configured to supplement power transmitted by the engine to the gear box.

36. The tree feller-buncher of claim 31, wherein the electric generator and the engine are both configured to drive the hydraulic system in response to a high power draw by the hydraulic system.

37. The tree feller-buncher of claim 27, wherein the power inverter is configured to receive electrical power from the electric generator and the energy storage device, and further configured to transfer the electrical power to the electric motor.

38. The tree feller-buncher of claim 26, wherein the second configuration is a braking configuration that brakes the saw blade.

\* \* \* \* \*